June 20, 1944.　　　　A. O. BECKMAN　　　　2,351,579
METHOD AND APPARATUS FOR PROPORTIONING
Filed Nov. 22, 1941
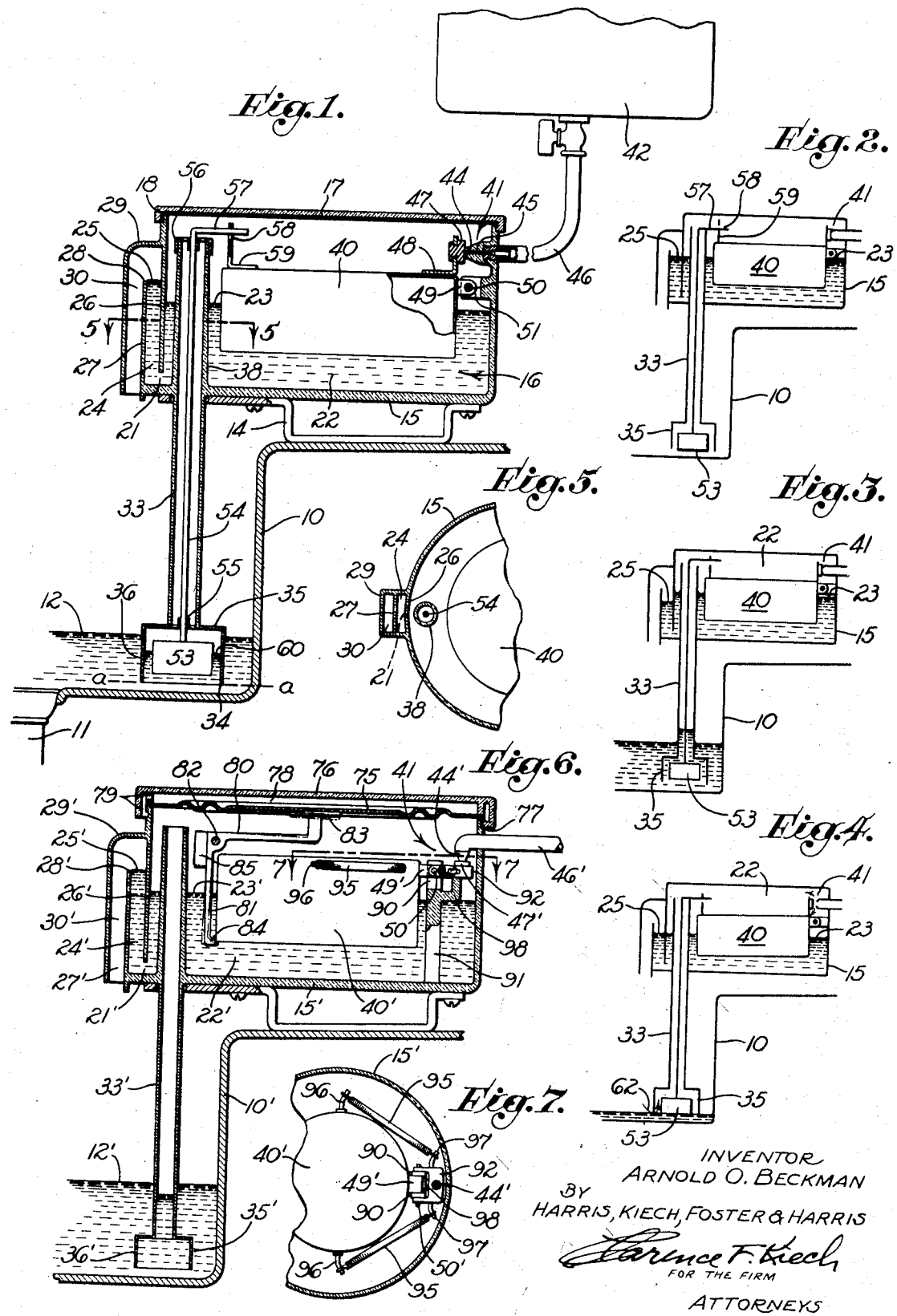
INVENTOR
ARNOLD O. BECKMAN
BY HARRIS, KIECH, FOSTER & HARRIS
Clarence F. Kiech
FOR THE FIRM
ATTORNEYS Patented June 20, 1944

2,351,579

UNITED STATES PATENT OFFICE 2,351,579

METHOD AND APPARATUS FOR PROPORTIONING

Arnold O. Beckman, Altadena, Calif., assignor to National Technical Laboratories, South Pasadena, Calif., a corporation of California Application November 22, 1941, Serial No. 420,140

20 Claims. (Cl. 137—68)

My invention relates to a novel method and apparatus for proportioning and, more particularly, to an automatic system for proportioning a solution into a receptacle as the liquid level therein rises, the term "solution" being used in its broadest sense to differentiate from the liquid in the receptacle and without limitation to chemical solutions as the liquid to be proportioned may comprise a pure chemical substance or compound.

The problem of proportioning one liquid into another has conventionally been solved by batch or continuous mixing of the liquids in amounts determined by weight, volume, flow, or pressure of the respective liquids. A common expedient used in continuous systems involves the flowing of proportioned amounts of the liquids together in a conduit preparatory to discharge into a receptacle. For example, in the formation of disinfecting solutions for the rinsing of eating utensils, glassware, etc., it has been proposed to proportion a germicide solution into a flowing stream of water discharging into the receptacle, in this instance usually a sink in which the rinsing operation is to be performed. A device of this character involves operative interconnection between the germicide supply and the water supply system.

It is an object of the present invention to provide a novel method and apparatus for proportioning a solution into a receptacle as the liquid level therein rises and which operates independently of the liquid supply system in the sense that the device can be independent of any piping supplying liquid to the receptacle and will automatically proportion solution thereinto whether the liquid is moved into the receptacle from a faucet or by pouring.

Another object of the invention is to dispose a body of solution in a container and to displace solution from this container into the receptacle in an amount substantially proportional to the amount of liquid added to the receptacle.

Another object of the invention is to provide a system in which a body of solution is subjected to a superatmospheric pressure which varies in response to the amount of liquid in the container and which utilizes such pressure variations to displace an amount of solution from the container into the receptacle as the liquid level therein rises.

Another object of the invention is to utilize a column of fluid between a body of the solution and a surface of the liquid, which rises as additional liquid is supplied to the receptacle, to displace solution into the receptacle.

Still another object of the invention is to provide a proportioning system involving an immersion tube which extends downward in the receptacle and which provides a lower end open to the atmosphere of the receptacle when no liquid is present therein, whereby a rise in liquid level in said receptacle entraps air in said immersion tube.

It is desirable that the lower end of such an immersion tube be slightly above the lower end of the receptacle. Correspondingly, during that period of time in which the liquid level rises to this lower end (and sometimes for an additional period of time involved in displacing the solution to an overflow position), there will be no proportioning of the solution. It is an object of the present invention to compensate for such factors to such an extent that a greater-than-normal proportion of the solution is delivered during the earlier part of the proportioning.

Another object of the invention is to provide a novel method and apparatus for displacing solution from a container into a receptacle and for renewing the supply of solution in said container during periods in which no solution is being proportioned into the receptacle. In this connection, the preferred embodiment of the invention involves a valve through which additional solution may be supplied to the container and provides for maintaining this valve closed during proportioning periods so that no solution can flow from the source of supply through the container and into the receptacle except under the control of the proportioning apparatus.

Another object of the invention is to provide a proportioning apparatus which is simple, accurate, and foolproof and which can be easily adapted to the proportioning of a solution into any type of receptacle.

Further objects and advantages of the invention will be made evident hereinafter.

The invention will be described with particular reference to the proportioning of a germicide solution into a receptacle, such as a sink. It will be understood, however, that the disclosure of this use is exemplary only, though the device finds particular applicability thereto. In this connection, numerous local and state regulations now require eating establishments to rinse eating untensils, dishes, glassware, etc., in a disinfecting solution prior to drying thereof. It is of importance that the germicide solution be proportioned rather accurately as the germicidal effect of the dilute solution is in large measure dependent upon an accurate control of such concentration. At the same time, the system should be sufficiently automatic as to require no attention on the part of an operator each time the sink is re-filled, and is desirably independent of the water supply to avoid any possible contamination thereof or inadvertent use of germicide solution for non-intended purposes.

Referring to the drawing:

Figure 1 is a diagrammatic view, partially in vertical section, of one form of the invention showing the levels of the solution and liquid during filling of the receptacle;

Figure 2 is a diagrammatic view showing the equilibrium levels of the solution when no liquid is in the receptacle;

Figure 3 is a diagrammatic view showing the relative levels during emptying of the receptacle;

Figure 4 is a diagrammatic view showing the system at the time emptying has progressed to expose the lower end of the immersion tube to the atmosphere;

Figure 5 is a fragmentary view in horizontal cross section, taken as indicated by the line 5—5 of Figure 1;

Figure 6 is a view, partially in vertical section, of an alternative embodiment of the invention; and Figure 7 is a fragmentary cross-sectional view, taken along the line 7—7 of Figure 6.

Referring particularly to Figure 1, the numeral 10 indicates a portion of the receptacle, in this instance a sink, provided with a drain 11 which can be closed by any suitable valve or plug means, not shown. Water is introduced into this receptacle from any suitable source, not shown. In Figure 1, the water level or surface is indicated by the numeral 12, representing a partially-filled position.

Supported above the surface 12 by a bracket 14 is a container 15 which retains a body of solution, indicated generally by the numeral 16. The container 15 provides a removable cover 17 and a gasket 18 to form a chamber above the solution 16 which is sealed from the surrounding atmosphere.

Means is provided for dividing the interior of the container 15 into two chambers which communicate with each other at their lower ends through a passage 21 and in which differential levels of the solution may exist. The larger of these chambers is herein-termed a main chamber 22 and contains one portion of the solution, hereinafter termed a supply portion, the surface or level of which is indicated by the numeral 23. The smaller of the two chambers is herein-termed a discharge chamber 24 and contains another portion of the solution, hereinafter termed a discharge portion, the surface or level of which is indicated by the numeral 25. The supply portion and the discharge portion of the solution are in open communication at positions below the surfaces 23 and 25 through the passage 21. The surfaces 23 and 25 are separated by a wall means 26, which also forms a separating boundary between the main chamber 22 and the discharge chamber 24 above the passage 21. The discharge chamber 24 is shown as extending from this wall means 26 to a side wall 27 extending upward from the bottom of the container 15.

If the pressure on the surface 23 is equal to that on the surface 25, as will be the case under equilibrium conditions when no water is in the receptacle 10, these surfaces will be at the same level, as suggested in Figure 2. If, however, the pressure in the chamber 22 is increased so as to make the pressure on the surface 23 greater than the atmospheric pressure acting upon the surface 25, the surface 23 will be displaced downward and a portion of the solution 16 will be displaced from the main chamber 22 to the discharge chamber 24 to raise the level 25 therein. This discharge chamber 24 provides an overflow means 28, shown as comprising the top of the side wall 27. Any liquid in the discharge chamber 24 which tends to rise above this overflow means is discharged downward into the receptacle 10. Preferably, the container 15 is equipped with a hood 29 providing a passage 30 outside the side wall 27 for guiding the solution downward to drop into the receptacle at a position above the maximum elevation of the surface of the water therein, though it will be clear that the proportioning device can be otherwise positioned with respect to the receptacle so long as the solution moving from the overflow means enters the water in the receptacle.

It is within the contemplation of the present invention to displace solution from the main chamber 22 to discharge over the overflow means 28 in an amount substantially proportional to the increase in the amount of water in this receptacle. Such volumetric displacement can be effected in numerous ways without departing from the spirit of the invention so long as it is of a character to raise the level 25 to its overflow position. Such displacement can be effected by transmission of pressure to the solution in the main chamber 22 and by controlling this pressure in response to an increase in the surface level 12 of the water in the receptacle 10. Within the contemplation of the invention, such displacement can also take place by any displacement means operating in response to an increase in the amount of water in the receptacle 10. The preferred manner of accomplishing this is to establish a column of fluid between a surface of the water which rises in response to an increase in the amount of water in the receptacle and a surface of the solution to be proportioned. Figure 1 indicates one manner of accomplishing this result.

As shown in Figure 1, an immersion tube 33 extends downward in the receptacle 10, and preferably in one corner thereof, and provides an open lower end 34, which is open to the atmosphere of the receptacle when no liquid is present therein. The lower end of the immersion tube 33 is preferably enlarged in the form of a bell 35 having an internal diameter substantially larger than the internal diameter of the immersion tube and having a cylindrical side wall 36 providing the open lower end 34 which is disposed close to, but spaced from, the bottom of the receptacle. When a small amount of water is placed in the receptacle sufficient to raise the surface to the level a—a, a body of air is entrapped within the immersion tube 33. As additional water is supplied to the receptacle 10, this air is displaced upward in a manner to be more particularly described hereinafter. Also, the pressure on this air is progressively increased above atmospheric value as the water level in the receptacle rises.

Such a body of air is in open communication with the upper end of the chamber 22 through a conduit 38 forming an upper extension of the immersion tube 33 and opening on the chamber 22 above the level of the overflow means 28. Correspondingly, the displacement effects and pressure variations within the immersion tube 33 which, during the latter part of the receptacle-filling operation, vary substantially proportionally to the increase in amount of water in the receptacle 10, depress the surface 23 to discharge solution over the overflow means 28.

Means is provided for delivering additional solution to the container 15 between proportioning periods. It is within the contemplation of the invention to utilize in this capacity any suitable means which will deliver sufficient solution to the container between proportioning periods to insure that a predetermined volume of solution will be present therein preparatory to the next proportioning operation. The embodiment shown in Figure 1 accomplishes this result by use of a float 40 in the chamber 22 operatively connected to a valve, indicated generally by the numeral 41, to which additional solution is supplied from a source 42. This source may be of any type which supplies solution to the valve 41 under a slight pressure and is indicated as a tank disposed at an elevation above the valve 41.

This valve 41 preferably provides a seat member 44 drilled to provide a passage 45 communicating with a pipe 46 extending to the source of supply 42. The inner face of this seat member 44 provides a valve seat adapted to be engaged by a valve member 47 secured to the float 40 by a bracket 48. This valve member may be formed of any material which will form a fluid-tight seal with the seat member 44 when pressed thereagainst. Preferably, this valve member is formed of resilient material, such as rubber.

The float 40 provides an arm 49 pivoted with respect to a pin 50 retained between bifurcations 51 of the container 15. Correspondingly, when the float 40 moves downward, the valve member 47 is moved from the seat member 44 and additional solution is supplied to the container 15. However, when the amount of solution in the container is sufficient to pivot the float 40 to a valve-closing position, this flow of solution to the container is immediately stopped. The float 40 is designed to stop the flow of incoming solution when the equilibrium levels of the surfaces 23 and 25 are a small distance below the overflow means 28, which represents the positions of these surfaces preparatory to a proportioning operation.

The invention comprehends the use of a means for preventing delivery of solution through the valve means 41 to the container 15 during the proportioning operation. It will be apparent that, if additional solution were thus supplied during proportioning, it might change the pressure in the container and permit discharge of solution from the container while not under the control of the proportioning means. Such actions can be avoided by retaining the valve means 41 in closed position during proportioning periods, and the invention contemplates various ways of accomplishing this, two of which are shown in Figures 1 and 6, respectively, another being shown in my copending application, Serial No. 420,139, filed November 22, 1941, illustrating another embodiment of the invention.

In Figure 1, the float 40 is held upward during the proportioning operation by use of an auxiliary float 53 disposed in the bell 35 to be raised and lowered by a change in water level therein. This auxiliary float carries a rod 54 which is loosely journalled in spiders 55 and 56 to permit free vertical motion. The upper end of this rod 54 is bent to form an arm 57 extending through an opening 58 of a bracket 59 attached to that end of the float 40 opposite the bracket 48. The opening 58 is considerably larger than the arm 57 to permit relative motion between this arm and the bracket 59, as will be hereinafter described.

The mode of operation of the form shown in Figure 1 is as follows. When the receptacle 10 is emptied (or when the proportioning apparatus is first installed and no water has been placed in the receptacle), the floats 40 and 53 will be lowered from their positions shown in Figure 1 to positions determined by contact between the arm 57 and the spider 56. This downward movement is sufficient to permit solution to flow into the container 15 to establish the equilibrium levels shown in Figure 2, at which time the float 40 moves upward to close the valve means 41. It will be noted that this equilibrium level of the surfaces 23 and 25 is slightly below the overflow means 28. As will be apparent from Figure 2, there is sufficient play between the arm 57 and the opening 58 of the bracket 59 to permit the float to rise to a valve-closing position while the arm 57 rests on the spider 56. The device is now ready for a proportioning operation and it will be noted that the chamber 22 of the container 15 is at atmospheric pressure through open communication with the atmosphere in the receptacle 10 by way of the immersion tube 33.

As water is poured into the receptacle 10 from any source, the liquid level therein rises as a function of the amount of water added. The proportioning means remains as shown in Figure 2 until the surface of the water reaches the level $a$—$a$ (Figure 1) to seal the lower open end 34 of the bell 35 and entrap a body of air, which at this instant is still at atmospheric pressure. As the amount of water in the receptacle 10 increases, the surface 12 will rise and there will be established a water surface 60 within the bell which rises therewith. Any rise in the surface 60 serves to displace air upward in the immersion tube and to increase the pressure on the entrapped air to a superatmospheric value. Both factors are instrumental in depressing the surface 23 and elevating the surface 25 toward its overflow position adjacent the overflow means 28. By proper design of the immersion tube 33 and bell 35, the device can be made to discharge into the receptacle 10 an amount of solution which is substantially proportional to the increase in the amount of water in the receptacle.

Figure 1 shows the liquid levels during filling and near the start of the proportioning of solution into the receptacle 10. In the absence of the auxiliary float 53 and the arm 54, the float 40 would tend to move downward with the surface 23 and open the valve. This motion is precluded by the lifting of the auxiliary float 53 as soon as the water surface 60 rises within the bell 35. This moves the arm 57 to the upper end of the opening 58 of the bracket 59 and holds the float 40 in its valve-closing position during filling of the receptacle and, in fact, until the subsequent emptying of the receptacle is practically complete.

Filling of the receptacle can be stopped when the surface 12 is at any desired position, and it will be apparent that the surfaces 23 and 25 will be at differential levels, depending both upon the design of the apparatus and the actual amount of solution displaced from the main chamber 22 into the discharge chamber 24 and thence from the overflow means 28. However, these conditions change as soon as the drain 11 is open to start the emptying operation. As the surface 12 moves downward in the receptacle, the differential between surfaces 23 and 25 and surfaces 60 and 12 decreases and may even reverse. When the pressure within the immersion tube 33 is reduced to atmospheric value, there will be no such differential and this condition will usually attain prior to the time that the surface 12 drops below the open end 34 of the immersion tube 33. This is because of the fact that, while a portion of the body of solution 16 has been displaced from the container 15, none of the air entrapped in the immersion tube 33 and chamber 22 has escaped. As the surface 12 continues to drop, there may be a slight vacuum within the chamber 22, shown exaggerated in Figure 3 to indicate a differential, opposite to that which occurred during filling, between surfaces 23 and 25 and between surfaces 60 and 12.

When the surface 12 drops to the level a—a, air can enter the immersion tube 33 and bring the pressure in the chamber 19 to atmospheric value. This inflow of air is indicated in Figure 4 by the numeral 62. The auxiliary float 53 which, during the emptying operation, had been maintained buoyant by the liquid within the bell 35, now drops and permits lowering of the float 40, as suggested in Figure 4. Additional solution is thus supplied to the container 15 until the float 40 rises to a valve-closing position under the equilibrium conditions shown in Figure 2.

The following considerations should be kept in mind in the design of the system. The rate of overflow of the solution will depend on the rate of displacement thereof which, in turn, depends on the rate of rise of the water within the immersion tube and the relative sizes of this tube and the main chamber 22. A unit rise in the water level in the tube will displace therefrom a corresponding volume of air which, in turn, will displace a corresponding volume of solution from the container 15 into the receptacle. Knowing the concentration of the solution dispensed and the desired strength of the dilute solution, it is possible to secure satisfactory results with an immersion tube having an internal diameter of D in the following equation:

$$D = 0.0113 \sqrt{\frac{AC}{P}}$$

where:

D = internal diameter of the immersion tube (in inches)
A = cross-sectional area of the receptacle 10 (in square inches)
C = concentration or strength desired in the receptacle (in parts per million), and
P = concentration of metered solution (in per cent).

This formula can well be used to determine the internal diameter of the main section of the immersion tube if, as is presupposed in the formula, the receptacle is of the same area in horizontal cross section at different elevations. If not, the diameter of the immersion tube should be correlated with the receptacle diameter at each elevation to maintain proportionality therebetween.

A tube without a bell thereon may give entirely satisfactory results in less exacting installations, particularly if the open lower end of the immersion tube is close to the bottom of the receptacle. However, for more exact proportioning, it is desirable to use suitable compensation expedients.

It will be clear that no solution is proportioned during rise of the surface 12 to the level a—a and during the rise of the surface 25 from its equilibrium position (Figure 2) to its overflow position (Figure 1). In each instance, the distances involved may be made small so that proportioning at an accuracy within a few per cent can be obtained. For the more exacting installations, the bell 35 can be employed to effect compensation according to the following.

Remembering that the volume of solution displaced is substantially proportional to the volume of air displaced by a rise of the surface 60 between two points, the use of an enlarged chamber formed by the bell 35 can increase the rate of proportioning during that period when the surface 60 rises to the top of the bell 35. This involves a proper design of the composite volume of the space inside the bell 35 comprising the space above the top of the float 53 and in the annular chamber around the float. Considerations involved in this design should take into consideration that the excess volume provided by this composite space should be larger than a volume of the immersion tube 33 of equal height to compensate for two factors. In the first place, the excess volume provided by the bell 35 should compensate for that volume of the discharge passage 24 between the equilibrium level (Figure 2) of the surface 25 and the overflow position of this surface. In this embodiment of the invention, this volume of the discharge passage is small. In the second place, the excess volume provided by the bell 35 should be sufficient to displace and overflow a sufficient amount of the solution into the receptacle 10 by the time that the surface 60 reaches the top of the bell 35 to insure that the concentration of the dilute solution in the receptacle 10 will at this time be normal. This portion of the excess volume will vary with the distance between the open lower end 34 and the bottom of the receptacle.

It is the intention, if using the invention under exacting conditions, to increase the rate of proportioning from the instant this proportioning starts to the instant at which the surface 60 reaches the top of the bell 35, this rate being larger than the rate of proportioning during rise of the surface 60 in the immersion tube 33 in order to compensate for the lack of proportioning during rise of the surface 12 to the level a—a and during the additional period required to develop sufficient superatmospheric pressure in the chamber 22 to bring the surface 25 to the overflow position. By proper design, through empirical methods or by calculation, the excess displacement of air during the first portion of the filling of the receptacle 10 can be made to insure correct concentration at all times when the surface 12 is above a predetermined position. In practice, the diameter and height of the bell 35 can be varied to control this predetermined position of the surface 12. For example, if the receptacle 10 comprises a sink of usual dimensions, it is quite feasible, both in the embodiments of Figure 1 and Figure 6, to design the invention to insure correct concentrations any time that water is in the sink at a depth of an inch or so. In this event, whenever the depth of water is sufficient for rinsing purposes, the concentration will be correct.

Once the surface 60 enters the main body of the immersion tube, proportioning will be determined by the ratio of cross-sectional areas of the tube 33 and the receptacle 10, and any rise in the surface 60 through a given distance will displace a corresponding amount of solution from the chamber 22. At the same time as the surface 60 rises in the main body of the immersion tube 33, the pressure in the chamber 22 will increase slightly, though substantially proportionally to the amount of water added to the receptacle to give rise to this movement of the surface 60.

The alternative construction shown in Figure 6 represents another way of preventing flow of solution from the source 42 to the container 15 between proportioning periods without use of the auxiliary float 53 and its associated linkage. In general, the elements of Figure 6 which are common to Figure 1 are indicated by corresponding primed numerals.

In Figure 6, the top of the main chamber 22' is closed by a flexible diaphragm 75 which is removably held in pressure-tight relationship with the top of the container 15 by a cover 76 through a tongue-and-groove retaining means 77 of any suitable design. A small chamber 78 is provided between the diaphragm 75 and the cover 76, and this chamber is retained at atmospheric pressure through a vent means 79.

Disposed in the main chamber 22' is a bell crank providing horizontal and vertical arms 80 and 81, this bell crank being pivoted on a pin 82 fixed to the container 15'. The horizontal arm 80 carries a contact member 83 which moves up and down with the diaphragm 75 and the vertical arm 81 provides a ledge 84 adapted to extend beneath a lower corner of the float 40' when the bell crank is in the position shown in Figure 6. Means is provided for biasing the bell crank in a counter-clockwise direction tending to retain the ledge 84 beneath the float, this means being shown as a small weight 85 secured to the bell crank. In Figure 6, the positions of the elements are shown under conditions of superatmospheric pressure in the main chamber 22'. When atmospheric or subatmospheric pressure exists therein, the diaphragm 75 pivots the bell crank to a dotted line position in which the ledge 84 is removed from its locking relationship with the float 40' to clear or slide along the side of this float to permit movement thereof in response to changes in the position of the surface 23'.

Preparatory to proportioning, the container 15' will retain the supply of solution with equilibrium levels as indicated in Figure 2, these levels being determined by the rise of the float 40' to a valve-closing position. The bell crank will be in its dotted line position and the pressure in the main chamber 22' will be at atmospheric value. As water enters the receptacle to raise the surface 12', it will be apparent that air will be entrapped in the immersion tube 33', and that this air will be displaced upward as the depth of the water increases, thus proportioning solution from the container 15' into the receptacle 10', as previously described. As soon as the pressure on the entrapped air rises slightly above atmospheric value, and before the float 40' has had an opportunity to drop in sufficient amount to open the valve, the diaphragm 75 moves upward in response to the increased internal pressure and permits the bell crank to assume its full line position, at which time the ledge 84 moves under the float 40'. This condition remains so long as the pressure in the main chamber 22' is above atmospheric value.

During drainage of the receptacle 10', the pressure in the chamber 22' will decrease to atmospheric value and a slight vacuum may be created therein. Under either condition, the diaphragm 75 will move downward to pivot the bell crank into its dotted line position to release the float 40' which, then, will drop to open the valve 41' and permit additional solution to enter the container 15' until the float 40' closes the valve. It will thus be apparent that the pneumatic or pressure-operated system shown in Figure 6 can be used to prevent entry of additional solution into the container 15' during proportioning periods.

In this embodiment of the invention, a valve means similar to that shown in Figure 1 can be used, but I find it preferable to interpose a toggle mechanism between the float and the valve. Figures 6 and 7 show such a toggle mechanism diagrammatically. Here, the arm 49' of the float 40' is pivoted on a pin 50' between bifurcations 90 of a post 91 extending upward from the bottom of the container 15'. Also pivoted on this pin 50' is a bifurcated plate 92 carrying valve member 47'. The seat member 44' is, in this instance, disposed vertically so that the flow of the solution through the pipe 46' is controlled by an up-and-down motion of the valve member 47'.

Toggle means is utilized for operatively connecting the plate 92 and the float 40'. This is shown diagrammatically as including two springs 95, one end of each spring being connected at 96 to the float and the other end being connected to a transverse pin 97 carried by the plate 92. When the float 40' moves upward until the center line of the springs 95 is above the axis 50', the valve means 41' closes. When the float 40' drops sufficient to bring the center line of the springs below the axis of the pin 50', the valve means opens and the plate 92 moves to rest on a stop 98 carried by the post 91. It will be understood that the toggle means herein shown is diagrammatic and that various toggle constructions can be utilized. It is desirable to permit the float to move up and down for a distance of about 1/8 inch without operation of the valve means, though this dimension will vary with apparatus of different size and character.

It will be understood that the design of the bell 35' in Figure 6 will be slightly different from the bell 35 of Figure 1 due to the absence of the float 53. However, the general principles remain the same and the dimensions of the bell 35 can be determined empirically or by calculation to compensate for the deficiency in proportioning during the first rise of the surface 12 in the receptacle 10'. In actual practice, it will be found convenient to make the bell 35' of an internal diameter approximately twice that of the immersion tube 33', and the height of the side wall 36' may be designed to be from 1/2 inch to 1 inch, the distance from the lower end thereof to the bottom of the receptacle being a fraction of an inch. By appropriate design, both embodiments of the invention herein-illustrated can be made to proportion germicide solution into a sink of normal size with an error of not more than plus or minus .5% after more than 1 1/2 inches of water is placed in the sink. Even without use of an enlarged bell, it is possible to obtain an accuracy of plus or minus 1% if the immersion tube extends to about 1/8 inch from the bottom of the sink.

It should be understood that the figures of the drawing herewith-presented are not drawn to exact scale and that, in some instances, the showings of the liquid levels and dimensions have been exaggerated for purpose of clarity.

Various changes and modifications can be made without departing from the spirit of the invention as defined in the appended claims.

I claim as my invention:

1. A method of proportioning a solution into a liquid in a receptacle during successive proportioning operations when liquid is supplied to the receptacle to raise the liquid level therein, which method employs separated main and discharge columns of said solution in communication with each other at their lower ends and at such elevation with respect to said receptacle that solution may flow by gravity from said discharge column when the solution level therein reaches an overflow position, which method includes the steps of: adding solution to said columns between each proportioning operation in amount sufficient to establish an equilibrium level which is the same in each column and which is slightly below said overflow position while avoiding any supply of solution to said columns during each proportioning operation; and displacing solution from said main column into said discharge column in response to and substantially in proportion to a rise in level of said liquid in said receptacle to discharge from said overflow position into said receptacle an amount of said solution substantially proportional to the amount of liquid added to said receptacle.

2. An apparatus for proportioning a solution into a liquid in a receptacle as the liquid level therein rises, including in combination: a container adapted to retain a body of said solution; means for displacing a portion of said solution from said container into said receptacle in response to an increase in the amount of liquid in said receptacle; a source of supply of said solution; and means for admitting additional solution from said source of supply to said container only between periods of displacement of solution from said container to said receptacle in amount sufficient to compensate for the solution displaced from said container during the preceding period of displacement and for preventing admission of additional solution to said container from said source during each of said periods of displacement.

3. An apparatus for proportioning a solution into a liquid in a receptacle as the level therein rises, including in combination: a container in which is disposed a body of said solution providing two separated surfaces, said container providing an overflow means to which one of said surfaces may rise for overflow of solution into said receptacle; means responsive to an increase in the amount of said liquid in said receptacle for producing a pressure which increases above atmospheric value in response to an increase in said amount of liquid in said receptacle; means for transmitting said pressure to said second surface of said solution to displace a corresponding amount of said solution over said overflow means and into said receptacle; and an imperforate hood for said overflow means and forming a solution-delivery passage communicating with said overflow means and with said receptacle, said solution-delivery passage providing a lower end which is at an elevation above the liquid level in said receptacle at all times and which lower end is always open to the atmosphere, said solution-delivery passage being of sufficient size to conduct the overflowing solution while the overflowing solution fills only a portion of the passage whereby the remainder of said passage comprises a vent means for the constant venting of said overflow means to atmospheric pressure through said solution-delivery passage.

4. An apparatus for proportioning a solution into a liquid in a receptacle as the liquid level therein rises, including in combination: a container in which is disposed a body of said solution; wall means for dividing said body of solution into two communicating portions providing two surfaces separated by said wall means, said container providing an overflow means to which one of said surfaces may rise for overflow of solution into said receptacle; means for equalizing the pressures on said surfaces preparatory to a proportioning of said solution into said receptacle; means for displacing solution from one of said portions to the other of said portions in response to an increase in the amount of said liquid in said receptacle to discharge a corresponding amount of said solution into said receptacle through said overflow means; and means responsive to an equalization of pressures on said surfaces for supplying additional solution to said body of solution.

5. A combination as defined in claim 4, in which said wall means is joined to said container.

6. An apparatus for proportioning a solution into a liquid in a receptacle as the liquid level therein rises, including in combination: container means for retaining a body of said solution at a position to discharge into said receptacle, said container means providing a container defining a main chamber bounded by a wall means, a hood extending outward and downward from said wall means, a side wall structure providing a lower wall extending outward from said wall means and providing an upright wall extending upward from said lower wall into said hood in spaced relationship with said wall means, said upright wall being spaced from said wall means to define a discharge chamber separated from said main chamber by said wall means, said chambers being adapted respectively to retain main and discharge columns of said solution providing surfaces separated by said wall means, said container means including a passage through said wall means opening on said columns below the surfaces thereof and through which said main and discharge chambers are in open communication and said side wall providing at its upper end an overflow lip to which the solution in said discharge column may rise for overflow into said receptacle; means for creating a superatmospheric pressure which increases in response to an increase in the amount of said liquid in said receptacle; and means for transmitting said pressure to said surface of said solution in said main chamber to displace from said discharge chamber over said overflow lip into said receptacle an amount of said solution substantially proportional to the amount of liquid added to said receptacle.

7. An apparatus for proportioning a solution into a liquid in a receptacle as the liquid level therein rises, including in combination: an immersion tube extending downward in said receptacle and providing a lower end open to the atmosphere within said receptacle when said level of said liquid drops to a position thereunder, whereby a rise in said level during filling of said receptacle entraps air and forces same upward in said immersion tube; a container adapted to retain a body of said solution; overflow means for said container through which said solution can be discharged into said receptacle upon volumetric displacement of said body of solution;

means for displacing said solution in response to upward movement of said air entrapped in said immersion tube; a source of supply of said solution; means communicating between said source and said container for renewal of said body of solution therein; and means preventing flow of solution from said source of supply to said container during the discharge of solution from said container into said receptacle.

8. An apparatus for proportioning a solution into a liquid in a receptacle as the liquid level therein rises, including in combination: means for retaining a body of said solution at a position to discharge into said receptacle, said means providing a main chamber and a discharge chamber separated by a wall means and adapted respectively to retain main and discharge columns of said solution providing surfaces separated by said wall means, said means including a passage opening on said columns below the surfaces thereof and through which said main and discharge chambers are in open communication and said means including an overflow means to which the solution in said discharge column may rise for overflow into said receptacle; an immersion tube extending into said receptacle and providing an open lower end communicating with the atmosphere in said receptacle when no liquid is present therein and communicating with said surface of said solution in said main chamber to displace solution from said main chamber to said discharge chamber for discharge by said overflow means into said receptacle as the liquid level in said receptacle rises; and means responsive to a change in vertical position of one of said surfaces of said columns for supplying additional solution to said container only between periods of displacement of solution from said main chamber into said discharge chamber for discharge into said receptacle and for preventing such supply of additional solution to said container during such periods.

9. An apparatus for proportioning a solution into a liquid in a receptacle as the liquid level therein rises, including in combination: a container adapted to retain a body of said solution; overflow means for said container through which said solution can be discharged into said receptacle upon displacement of said body of solution; means for displacing a portion of said solution in response to an increase in the amount of liquid in said receptacle to discharge a substantially proportional amount of said solution into said container over said overflow means; a source of supply of said solution; valve means for controlling the flow of solution from said source to said container; and means operatively connected to said valve means for preventing flow of solution from said source of supply to said container during the discharge of solution from said container into said receptacle.

10. An apparatus for proportioning a solution into a liquid in a receptacle as the liquid level therein rises, including in combination: a container adapted to retain a body of said solution; means for displacing a portion of said solution from said container into said receptacle in response to an increase in the amount of liquid in said receptacle; a source of supply of said solution; valve means for controlling the flow of solution from said source of supply to said container; a float in said container and operatively connected to said valve to open same upon a lowering of said float and to close said valve upon a raising of said float; and means for retaining said float in valve-closing position during the displacement of solution from said container into said receptacle.

11. A combination as defined in claim 10, in which said last-named means includes an auxiliary float, means for mounting said auxiliary float to move upward upon a rise in the surface of said liquid in said receptacle, and means operatively connecting said auxiliary float to said first-named float to hold same in valve-closing position when said auxiliary float is raised by said liquid.

12. A combination as defined in claim 10, in which said float includes an element providing an opening, and in which said means for retaining said float in valve-closing position includes an arm extending into said opening, and an auxiliary float operatively connected to said arm, said auxiliary float being disposed in said receptacle to be lifted by rise in said liquid level therein.

13. A combination as defined in claim 10, in which said last-named means includes pressure-responsive means responsive to a difference in pressure inside and outside of said container, and means operatively connecting said pressure-responsive means to said float, and in which said means for displacing solution from said receptacle into said container includes means for changing the pressure in said container in response to an increase in the amount of said liquid in said receptacle.

14. A combination as defined in claim 10, in which said means for displacing liquid from said container into said receptacle includes means for building up a superatmospheric pressure in said container which increases in response to an increase in the amount of liquid in said receptacle, and in which said means for retaining said float in valve-closing position includes a diaphragm responsive to a difference in pressure between said container and the surrounding atmosphere, and means operatively connecting said diaphragm to said float to retain said float in valve-closing position during the time that a superatmospheric pressure exists in said container.

15. A combination as defined in claim 9, in which said means operatively connected to said valve means includes a float in said container, and means for pivoting said float with respect to said container.

16. An apparatus for proportioning a solution into a liquid in a receptacle as the liquid level therein rises, including in combination: a container adapted to retain a body of said solution; means for displacing a portion of said solution from said container into said receptacle in response to an increase in the amount of liquid in said receptacle; a source of supply of said solution; valve means for controlling the flow of solution from said source to said container; and control means for opening said valve means to renew said solution in said container between periods in which solution is being displaced into said receptacle and for retaining said valve means closed during such periods, said control means including a float in said container, and toggle means operatively connecting said float to said valve means to operate said valve only when said float moves beyond a predetermined position.

17. An apparatus for proportioning a solution into a liquid in a receptacle as the liquid level therein rises, including in combination: a container adapted to retain a body of said solution;

means for displacing a portion of said solution from said container into said receptacle in response to an increase in the amount of liquid in said receptacle; a source of supply of said solution; a valve means for controlling the flow of solution from said source to said container; and means preventing opening of said valve during displacement of said solution from said container into said receptacle.

18. A combination as defined in claim 10, in which said last-named means includes an auxiliary float and in which said means for displacing a portion of said solution from said container into said receptacle includes an immersion tube extending into said receptacle to be submerged as the surface of the liquid therein rises, said auxiliary float being disposed in said immersion tube, and means for operatively connecting said auxiliary float to said float in said container to hold same in valve-closing position during displacement of said portion of said solution from said container into said receptacle.

19. A combination as defined in claim 10, in which said means for retaining said float in valve-closing position includes auxiliary means responsive to a change in level of said liquid in said receptacle, and means operatively connecting said auxiliary means to said float to retain said float in valve-closing position during the displacement of solution from container into said receptacle.

20. In an apparatus for proportioning a solution into a receptacle as the liquid level in said receptacle rises, the combination of: a container providing an overflow means for discharging solution into said receptacle, said container retaining a body of solution having a normal surface level slightly below said overflow means; and means for raising said surface level to said overflow means and for displacing solution from said body of solution to overflow into said receptacle in response to an increase in the amount of liquid in said receptacle and at a rate which is higher initially than during the completion of the filling of said receptacle to insure substantial proportionality of solution and liquid when the liquid level in said receptacle is above a predetermined point, said means including an immersion tube extending downward in said receptacle and a bell at the lower end of said tube, said bell being open to the atmosphere in said receptacle when said receptacle is empty and being of larger internal diameter than said tube, the lower open end of said bell terminating a short distance above the bottom of said receptacle to be submerged by the rising liquid in said receptacle and to entrap air in said bell and said immersion tube as the receptacle liquid rises both in said receptacle and in said bell and tube, there being no overflow of said solution from said container into said receptacle during the time required for said liquid level to reach said lower open end of said bell nor during the time required for raising said surface level to said overflow means, said bell being of sufficiently larger internal diameter than said tube to entrap initially an excess amount of air sufficient to increase said initial rate of proportioning to compensate for said time required for submergence and said time required for raising said surface level to said overflow means while the receptacle liquid rises in said bell and before the receptacle liquid rises any substantial distance into said immersion tube; a source of supply of said solution; means communicating between said source and said container for renewal of said body of solution therein; and means preventing flow of solution from said source of supply to said container during the discharge of solution from said container into said receptacle.

ARNOLD O. BECKMAN.